(12) United States Patent
Menezes et al.

(10) Patent No.: US 7,933,884 B2
(45) Date of Patent: Apr. 26, 2011

(54) APPARATUS AND METHODS FOR TRACKING, QUERYING, AND VISUALIZING BEHAVIOR TARGETING PROCESSES

(75) Inventors: Michael J. Menezes, Fremont, CA (US); Jaffar Khoshgozaran, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 423 days.

(21) Appl. No.: 12/022,939

(22) Filed: Jan. 30, 2008

(65) Prior Publication Data
US 2009/0193014 A1 Jul. 30, 2009

(51) Int. Cl.
*G06F 17/30* (2006.01)
(52) U.S. Cl. ........................................... 707/706
(58) Field of Classification Search ............... 707/2, 5, 707/10, 706
See application file for complete search history.

(56) References Cited

U.S. PATENT DOCUMENTS

| | | | |
|---|---|---|---|
| 6,360,215 B1* | 3/2002 | Judd et al. | 1/1 |
| 2005/0102202 A1* | 5/2005 | Linden et al. | 705/27 |
| 2007/0260624 A1* | 11/2007 | Chung et al. | 707/101 |

* cited by examiner

*Primary Examiner* — Etienne P LeRoux
(74) *Attorney, Agent, or Firm* — Weaver Austin Villeneuve & Sampson LLP

(57) ABSTRACT

Disclosed are apparatus and methods for providing information that is related to user on-line behavior, which was also used at least partly to generate user scores by one or more behavior targeting processes. A query client may select to receive information from a plurality of different data feeds that are retained within a plurality of different databases by a plurality of different behavior targeting processes. The selectable data feeds generally correspond to different types or aggregations of user on-line behavior. In certain embodiments, information from the selected data feeds for a particular user is compiled and presented in a single, interactive user interface that allows the client to easily view various aspects of such information.

21 Claims, 7 Drawing Sheets

Figure 2

| User ID | Date | Term | Search Results | Selected | Rank | Geo. |
|---|---|---|---|---|---|---|
| ID_1 | Jan. 2, 2006, 3:03pm | Vista | x | no | 1 | US |
| ID_1 | Jan. 2, 2006, 3:03pm | Vista | y | no | 2 | US |
| ID_1 | Jan. 2, 2006, 3:03pm | Vista | z | yes | 3 | US |
| ID_2 | Jan. 2, 2006, 3:15pm | Vista | x | no | 1 | JP |
| ID_2 | Jan. 2, 2006, 3:15pm | Vista | y | yes | 2 | JP |
| ID_2 | Jan. 2, 2006, 3:15pm | Vista | z | no | 3 | JP |
| ID_1 | Jan. 2, 2006, 3:35pm | World Cup | A | no | 1 | EUR |
| ID_1 | Jan. 2, 2006, 3:35pm | World Cup | B | no | 2 | EUR |
| ID_1 | Jan. 2, 2006, 3:35pm | World Cup | C | no | 3 | EUR |
| ID_1 | Jan. 2, 2006, 3:35pm | World Cup | D | no | 4 | EUR |

Figure 3

Categories of Each Search Keyword

| Search Word | Finance | Tech. & Tele. | Travel | Retail | Entertain. | Auto. | CPG | Pharm. | Sports | Biz |
|---|---|---|---|---|---|---|---|---|---|---|
| World Cup | N | N | Y | N | N | N | N | N | Y | N |
| Vista | N | Y | N | N | N | N | N | N | N | Y |

Figure 4

User Scores

| User | Fin. | Tech. | Trav. | Retail | Enter. | Auto. | CPG | Pharm. | Biz. | Sports |
|---|---|---|---|---|---|---|---|---|---|---|
| ID_1 | 2 | 6 | 4 | 3 | 3 | 3 | 4 | 7 | 6 | 3 |
| ID_2 | 1 | 1 | 4 | 5 | 2 | 1 | 1 | 9 | 1 | 3 |

APPARATUS AND METHODS FOR TRACKING, QUERYING, AND VISUALIZING BEHAVIOR TARGETING PROCESSES

BACKGROUND OF THE INVENTION

The present invention is related to providing information regarding a user's on-line interactions that are performed over a computer network, such as the Internet. It especially pertains to providing information regarding user behavior targeting, e.g., advertisement targeting.

In general, targeting engines operate to profile on-line users and visitors with specific affinities and interests derived from their actual online behavior so that users with particular profiles may be affectively targeted with particular on-line advertisements. A user profile may depend on any number of user actions on-line or over a computer network, such as viewing a web page, clicking on an advertisement, performing a web search based on one or more keywords, etc. A user profile may include scores in particular categories or a user's areas of interest, such as electronics, travel, automotive, etc. After users are profiled, advertisements may then be targeted or displayed to such users based directly on how the targeted users scored in each category.

Although behavior targeting processes typically provide users scores that are helpful to then target the users who would be most likely to purchase particular products or services, some behavior targeting processes can produce inaccurate user scores. That is, a behavior targeting process may provide user scores that do not accurately correlate to a user's actual preferences. Categorizing users incorrectly can cause irrelevant advertisements to be displayed to these incorrectly categorized users, which results in huge revenue loss.

Accordingly, it would be beneficial to provide mechanisms and techniques to ensure that the targeting engine is correctly categorizing users based on their on-line behavior and/or to be able to detect and trace errors in an efficient and accurate manner. It would especially be beneficial to provide information regarding user on-line behavior as it pertains to a particular user's or set of users' scores.

SUMMARY OF THE INVENTION

Accordingly, apparatus and methods for providing information that is related to user on-line behavior, which was also used at least partly to generate user scores by one or more behavior targeting processes, are provided. A query client may select to receive information from a plurality of different data feeds that are retained within a plurality of different databases by a plurality of different behavior targeting processes. The selectable data feeds generally correspond to different types or aggregations of user on-line behavior. In certain embodiments, information from the selected data feeds for a particular user is compiled and presented in a single, interactive user interface that allows the client to easily view various aspects of such information.

In one embodiment, a method for presenting information regarding a user's on-line behavior is disclosed. A query for a selected user and one or more selected data feeds, which each corresponds to a stream of data that has been logged for a specific type of on-line user activity that has been performed by a plurality of users at multiple times, is received from a query client. The selected one or more data feeds are obtained for the selected user from one or more databases in which a plurality of different data feeds for a plurality of different types or aggregations of on-line activities have been retained, and a plurality of scores are also obtained. The scores are based on at least a portion of the one or more selected data feeds. Information is combined from the obtained one or more data feeds along with the obtained scores for the selected user. This combined information is presented to the querying client.

In a specific implementation, the selected user of the query is specified by a cookie. In yet another embodiment, the different types of on-line activities include performing search queries, selecting (or clicking) search results, selecting (or clicking) sponsor type search results, viewing advertisements, selecting (or clicking) advertisements, and selecting (or clicking) web pages. In a further aspect, at least one of the different feeds aggregates one or more data streams for the different types of on-line activities over a specified period of time. In yet a further aspect, the query includes a selected time period and the selected one or more data feeds are obtained for the selected time period. In this example, the presented scores are based on at least a portion of the one or more selected data feeds over the selected time period.

In another embodiment, the selected one or more feeds include a feed for a stream of search queries, and a list of search queries that were performed by the selected user are presented so that each search in the presented list includes a time and date value, a search term value, a search result, a selection field indicating whether the user has selected the search result, and a ranking value for the search result. In another aspect, the selected one or more feeds include a feed for a stream of web page selections performed by the selected user as the selected user moves from a source page to a destination page, wherein the source and destination are specified by the received query. In yet another implementation, the selected one or more feeds include a feed for a stream of advertisement data, and wherein a list of advertisements that were viewed or selected by the selected user are presented to the query client so that each advertisement in the presented list includes a time and date value, an advertisement identifier, and a selection field indicating whether the user has selected the advertisement.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of the invention and the accompanying figures which illustrate by way of example the principles of the invention.

BRIEF DESCRIPTION OF THE DRAWINGS

FIG. 2 illustrates an example user search database in accordance with one implementation of the present invention.

FIG. 3 illustrates a category and search term data structure in accordance with one embodiment of the present invention.

FIG. 4 illustrates a user score data structure in accordance with one embodiment of the present invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention include mechanisms to manage queries for information regarding a user's on-line behavior that is related to user targeting scores which are produced by specified behavior targeting processes or modules. Although a query may pertain to one or more different behavior targeting processes that log and analyze different data streams or "feeds" of user on-line activities across various databases, information from the different feeds of user on-line activities is presented to the querying client via an organized central interface. That is, a querying client can select different behavior targeting feeds and parameters that may relate to particular user targeting scores of interest. The querying client can then advantageously review the presented feed information to then determine how a particular score is generated and whether such score inaccurately reflects the presented user behavior.

Figure 1:
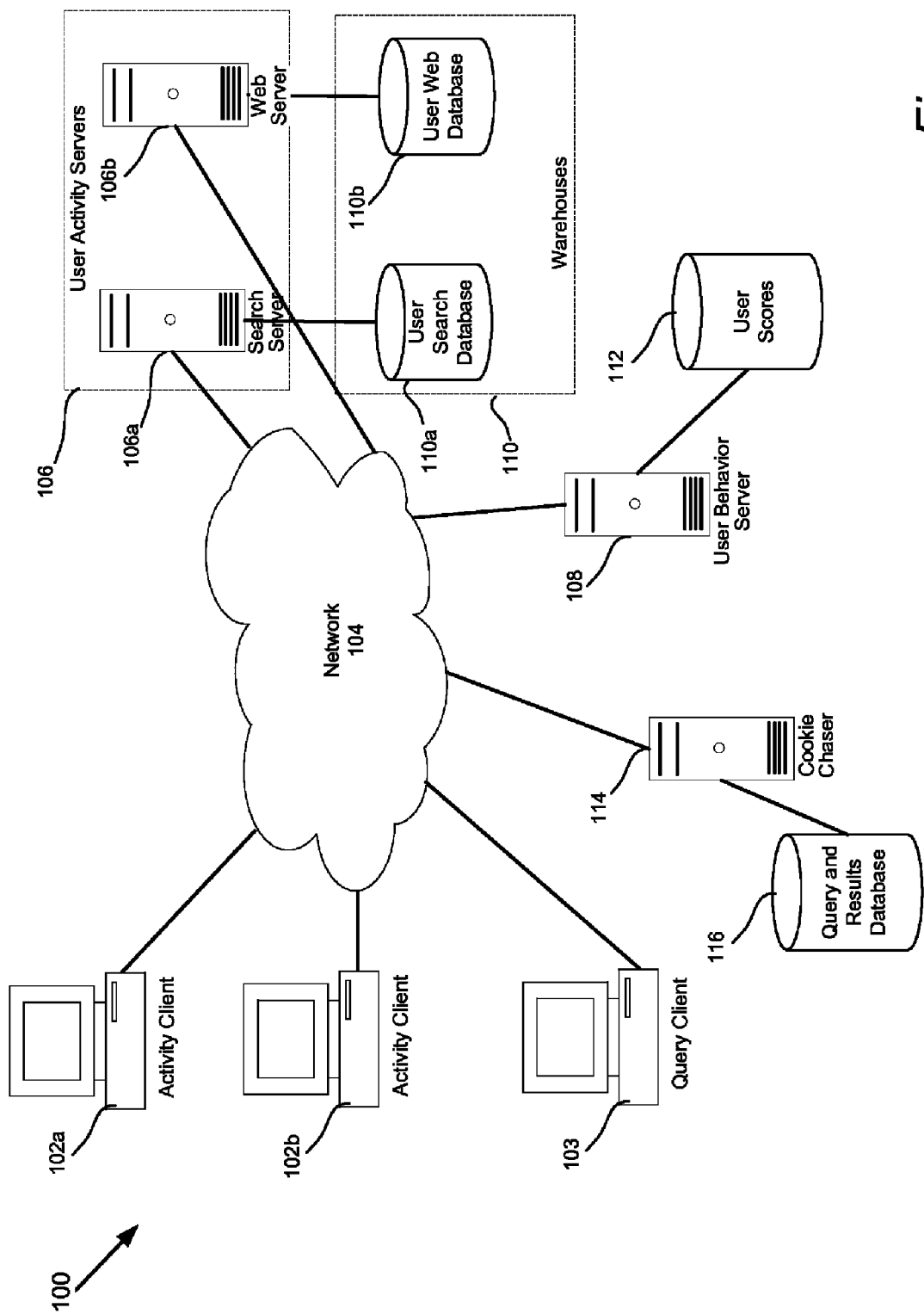
FIG. 1 illustrates an example network segment in which the present invention may be implemented in accordance with one embodiment of the present invention.

FIG. 1 illustrates an example network segment 100 in which the invention may be implemented in accordance with one embodiment. This example network segment 100 will be used to generally describe how various user on-line behavior feeds may be logged and analyzed by various behavior targeting modules and how various aspects of such feeds may then be presented to querying clients in accordance with one embodiment of the present invention.

This example network segment 100 includes a plurality of activity clients 102 that are operable to perform for a user any number and type of on-line activities with one or more user activity servers 106 via network 104. For instance, users may initiate on-line activities by sending a service request from one or more activity clients 102 to one or more activity servers 106 via network 104. The network 104 may take any suitable form, such as a wide area network or portions of the Internet and/or one or more local area networks (LAN's). The network 104 may include any suitable number and type of devices, e.g., routers and switches, for forwarding requests from the client to the servers and then sending responses from the servers back to the requesting clients, as well as other types of data communicated between clients and servers.

The user activity servers 106 may take any suitable form so that user activities may be logged and such logged activity information may then be accessed as needed. Alternatively, a logging process may be implemented on one or more servers or devices that are physically separate from the activity servers. In this later implementation, logging servers (not shown) would operate to interact with the activity servers 106 to receive user information regarding user on-line behavior and then to log at least a portion of such received user information.

In the illustrated example, the user activity servers 106 include a search server 106a for performing searches and a web server 106b although any number and type of servers are contemplated. In one embodiment, only user activities which are performed with respect to a particular web service provider are logged. One example provider is Yahoo! of Sunnyvale, Calif. that provides search servers, web servers, etc. Of course, the data feeds that are accessed and presented in the current invention may also originate from user interaction with a diverse set of unaffiliated service providers or the like. In this later case, the service providers would need to provide an open interface for accessing their data feeds.

As users participate in activities with one or more user activity servers 106 of the illustrated example, user behavior feeds regarding such different activities may be retained in one or more warehouses 110. As shown, the warehouses include one or more user search database(s) 110a for retaining feed information regarding user searches and one or more user web database(s) 110b for retaining feed information regarding web activities. The feed information may include a plurality of data feeds pertaining to different types of user activity as described further below.

The system 100 may also include one or more user behavior server(s) 108 for accessing the retained user activity information from one or more warehouses so as to determine one or more user scores for particular categories or areas of interest. User scores may be stored in one or more user scores database(s) 112. The user behavior servers 108 generally operate to analyze different data feeds and then determine user scores based on some or all of such data feeds.

Embodiments of the present invention include mechanisms for providing information pertaining to these determined user scores. In the illustrated example, a cookie chaser server 114 is operable to present information regarding the user scores based on user activity information logged in one or more warehouses 110. The cookie chaser server 114 is operable to provide such information to one or more query clients 103, e.g., query client 103. The cookie chaser server 114 may itself utilize one or more query and results database(s) 116 for storing client queries and parameters, as well as query results before presenting them to the query client 103 or during interactive modes of presenting one or more portions of such results. Several cookie chaser embodiments are described further below.

First, example systems and processes for logging specific types of user activities will be described. Although the logging of user activities is mainly described in terms of activities that are carried out during execution of user search and web page services, it is understood that any suitable types of user activities may also be logged for use in the present invention. Additionally, although the logging and cookie chaser processes are described as being controlled by a single provider, such as Yahoo!, these processes may be alternatively performed by a heterogeneous group of entities, e.g., one or more logging entities that each provides an open database interface for allowing external parties to access the relevant warehouse databases.

Referring back to the illustrated embodiment, the search application of search server 106a, for example, may take any suitable form. For example, the search application may present a web page having any input feature to the client so the client can enter one or more search term(s). In a typical implementation, the search application includes an input box into which a user may type any number of search terms. Embodiments of the present invention may be employed with respect to any search application, and example search applications include Yahoo! Search, Google, Altavista, Ask Jeeves, etc. The search application may be implemented on any number of servers although only a single search server 106a is illustrated for clarity.

The search server 106a (or servers) may have access to one or more user search database(s) 110a into which user search information is retained. Each time a user performs a search on one or more search terms, information regarding such search terms and search results may be retained in the user search database(s) 110a. For instance, the user's search request may contain any number of parameters, such as user or browser identity and the search terms that may be retained in the user search database(s) 110a. Additional information related to the search, such as the current time, may also be retained along with the search request parameters. When search results are presented to the user based on the entered search terms, parameters from such search results may also be retained. For example, the specific search results, such as the web sites, the order or ranking in which the search results are presented, and which search result is selected by the user (if any) may also be retained in the user search database(s) 110a.

The user search database(s) may take any suitable form for retaining useful search information over time. FIG. 2 illustrates an example user search database 200 in accordance with one implementation of the present invention. As shown, the user search database 200 includes a plurality of entries 202a~202c for a first search by a first user ID_1, entries 204a~204c for a second search by a second user ID_2, and entries 206a~206d for a third search by the same first user ID_1. Each entry relates various parameters of a particular user's search for a particular search term and a particular search result. In the illustrated example, each entry may include a user identifier (ID), date, search term, search result, whether such search result was selected by the user, the ranking of each search result with respect to the other search results produced for the same search, and a geographical location.

The user ID may correspond to any characteristic associated with the searcher, and the searcher may be a person or an automated entity. This ID may be associated directly with some form of a user's on-line identity. By way of examples, the user ID may be obtained from a user web cookie, e.g., a cookie associated with a logged in user, or a browser cookie. A user web cookie is generally a file or text object, for example, in an HTTP format, that is sent by a particular client each time the client accesses a server or a particular server of a service provider, such as Yahoo! In general, cookies are used to authenticate, track and maintain information about a particular user, such as the user's preferences for a particular web page. A specific cookie is typically created and associated with a user when the user registers with a server or initiates contact with such server without performing a registration or login process. This initial cookie is sent to the user by the server and then stored on the user's computer. This stored cookie can then be sent from the user's client computer to the server when the user accesses the particular server again.

The date field may correspond to any suitable time format, and may specify any combination of day, month, year, time, and time zone. The search term corresponds to a search term that was used in a specific search. A specific search may include more than one search term, which may be included in a different entry of the user search database. One or more category field (not shown) may be included in each user search entry to specify in which categories the search term of a specific search belongs. The Ranking column in the table may correspond to the original ranking by the search algorithm of each search result based on the search term and the significance and frequency of its presence within the particular search result's web page.

In the present example, a separate entry may be formed for each search term and search result pair. For example, entries 202a~c each include a user ID equal to "ID_1" and a date "Jan. 2, 2006, 3:03 pm" for a first search on the search term "Vista", which produces search results x, y, and z. A "no" in the Selected field of entries 202a and 202b indicate that such search results were not clicked (or selected) by the user ID_1. Entry 202c corresponds to search result "z", which is indicated as selected by the user ID_1 (e.g., "yes" is indicated in the Selected field). Each search result may also be ranked in the Rank field. As shown, search results x, y, and z (from the same search on search term "Vista") are ranked 1, 2, and 3, respectively, from a highest to lowest rank. As shown in entries 204a~204c, user ID_2 has also performed a search for search term "Vista", but has selected the search result "y." Lastly, entries 206a~206d correspond to a third search by user ID_1 for search term "Vista", with no search results being selected by user ID_1.

Each search may also be associated with a particular geographical location. For example, the geographical location may specify the origin domain for the particular search request. As shown, search 202 originates from the United States; search 204 originates from Japan; and search 206 originates from Europe.

Likewise, the specifically presented advertisements and whether the user views or selects an advertisement may also be retained in one or more database(s), such as search database 10a and/or web database 110b. Alternatively, a user advertisement database similar to the user search database may be retained for each search or other type activity that is performed by the user in which the user is presented with advertisement links or windows. A user advertisement database may include the following fields: user identity, time of search (or other activity), advertisement result (e.g., in the form of a hyperlink presented along with the search results or other activity), a selection field indicating whether the user has selected or clicked on such advertisement result, ranking value, geographical location of the user, etc.

The plurality of search terms or advertisements may also be divided among specific categories, e.g., by user behavior server 108. In one implementation, the categories each relate to a particular product or service category, such as finance, technology and telecommunications, travel, retail, entertainment, automotive, CPG (consumer packaging group), and pharmaceutical. Other category choices may also be used, such as arts, business, computer, health, politics, sports, etc.

Any suitable data structure may be used to specify into which categories a particular search term or advertisement belongs. FIG. 3 illustrates a category and search term data structure 300 in accordance with one embodiment of the present invention. In this example, each entry 302 includes a search term and specifies to which categories such search term belongs. In this implementation, each search term is associated with a plurality of different category fields that are set to "y" (i.e., yes) or "n" (i.e., no), depending on whether the search term belongs to such category. For example, entry 302a corresponds to the search term "World Cup" and specifies that this search term belongs to the "travel" and "sports" category. Entry 302b corresponds to the search term "Vista" and specifies that this search term belongs to the "Technology and Telecommunications" and "Biz" categories. A similar data structure may be utilized to categorize particular advertisements, e.g., an identity of a particular advertisement is associated with a plurality of different category values.

In certain embodiments of the present invention, a user behavior server (e.g., 108 of FIG. 1) operates to score users with respect to particular search term or advertisement categories, and these scores are retained in one or more user scores databases 112. The user scores databases 112 may include any suitable data structure for specifying one or more scores for the knowledge and/or interest level in each category for each user. Each user may also be scored based on education level. FIG. 4 illustrates a user scores data structure 400 in accordance with one implementation of the present invention. As shown, each entry 402a and 402b include a score for each of a plurality of categories and a particular user. For instance, entry 402a includes a user field for specifying a user identity ID_1 and a plurality of category fields for specifying a score of user ID_1's level of knowledge or interest in each category. Entry 402b includes scores for user ID_2's knowledge and/or interest in each of a plurality of categories.

The user knowledge/interest scores for each category may be binary and specify one of two values, such as 1 or 0. A first score value, e.g., 1, may indicate that the user has at least some knowledge and/or interest in the corresponding category, while a second score value, e.g., 0, may indicate that the user has no knowledge or interest in the corresponding category. In another implementation, the user score for each category may be selected from a plurality of ordinal numbers from a highest to low number. In the example of FIG. 4, scores are selected from ordinal numbers 1 through 10, with 1 being the lowest ranking and 10 being the highest ranking. Any suitable score scale may be implemented with any suitable range and with integer or whole numbers.

The user score values for each user may be obtained in any suitable manner. In general, user scores can be generated based on a user's on-line behavior, which may include information given by the user during a registration process and a user's other on-line activities, such as search queries, search result selections, viewing of advertisements, selection of advertisements, selection of web pages, viewing of web pages, etc.

Once a user's category scores (and possibly other types of scores) are determined based on at least a portion of such user's on-line activities, the cookie chaser module is then operable to interactively present information from one or more selected data feeds that were used to generate such scores. Any suitable mechanism may be utilized to implement a cookie chaser process.

Figure 5:
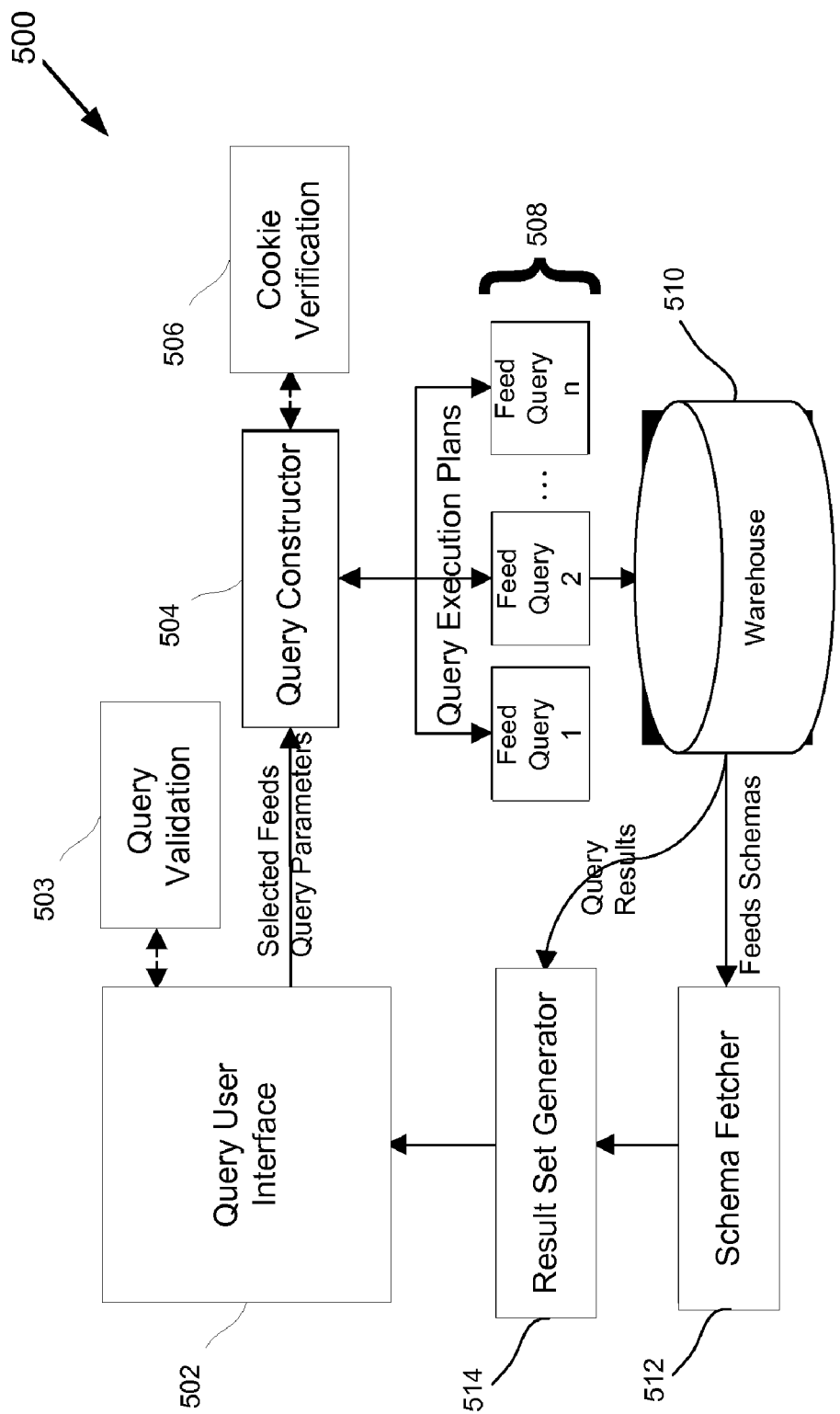
FIG. 5 is a diagrammatic representation of a cookie chaser architecture in accordance with a specific implementation of the present invention.

FIG. 5 is a diagrammatic representation of a cookie chaser architecture 500 in accordance with a specific implementation of the present invention. Although this embodiment is described in terms of a "cookie" chaser, it is recognized that a user's behavior may be tracked and presented based on any suitable user identity, besides a cookie. That is, embodiments of the present invention include mechanisms for tracking and presenting any suitable identified user's activities across various data feeds.

In a specific implementation, the cookie chaser 500 is a client server application As shown, the cookie chaser architecture 500 may include a client user interface 502 that allows a user to easily select different data feeds and input different query parameters related to such selected feeds. The user interface 502 may take any suitable format for allowing a client to initiate a query regarding selected data feeds of user on-line activities.

Figure 6:
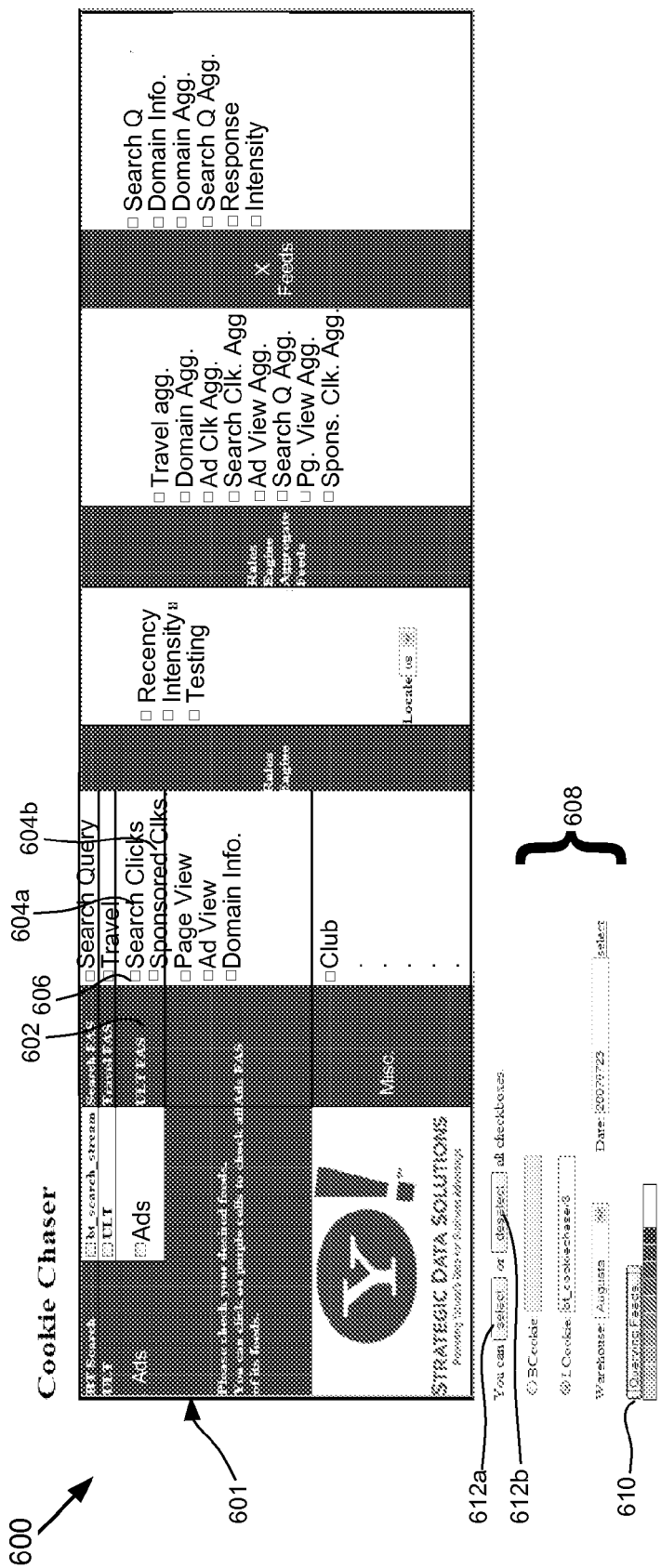
FIG. 6 is a diagrammatic representation of a user interface for allowing a client to initiate a cookie chaser query in accordance with one embodiment of the present invention.

FIG. 6 is a diagrammatic representation of a user interface 600 for allowing a client to initiate a cookie chaser query in accordance with one embodiment of the present invention. As shown, the interface 600 is arranged into groups of selectable data feeds in upper interface portion 601.

Each group has a dark colored selectable feed button that is associated with one or more light colored selectable feeds having checkboxes. For example, a dark colored ULT FAS (universal link tracker, fact aggregation system) feed button 602 is associated with two light colored checkbox type feeds 604a and 604b for "Search Clicks" and "Sponsored Clicks", respectively. Selection of a dark colored feed automatically causes the associated light colored feeds to also be selected. For instance, if the ULT FAS feed 602 were selected, the "Search Clicks" feed 604a and "Sponsored Clicks" 604b would automatically be selected. Each individual light colored feed may also be selected directly by checking the associated checkbox, e.g., checkbox 606.

The selectable feeds may include any suitable type and number of data feeds for representing user behavior. Data feeds may track any one or more of the following user activities: performing search queries, selecting (or clicking) search results, selecting (or clicking) sponsor type search results, viewing an advertisements, selecting (or clicking) advertisements, selecting (or clicking) web pages, etc. A data feed may also include an aggregation of any of the above listed data feeds over a specified time period, e.g., during an advertisement campaign.

In the illustrated example, a "BT (behavioral targeting) search" or "bt_search_stream" corresponds to a list of searches that are performed by the selected user. In contrast, the "search FAS" or "search query" corresponds to an aggregation of searches for such user over a specified period of time, as well as a set of user scores that are determined for such aggregation of the specified time period. That is, the query results for a selection of the "search FAS" or "search query" feed will include a different list of searches and user scores for different time period selections. For example, a shorter time window may be specified to observe the effects of a particular advertisement campaign, while a longer time window is used to observe average user behavior regardless of a particular advertisement campaign.

The ULT (universal links tracking) feed captures the web links which the specified user has viewed or selected or clicked as the user moves between a first, "source" page and a last, "destination" page. When this feed is selected, a source and destination page may also have to be entered by the user in parameter area 608, for example. The ULT FAS corresponds to an aggregation of such ULT data over a specified period of time. The ULT FAS feed also corresponds to two individual feeds: a "search clicks" feed that corresponds to links that were selected as a search result and a "sponsored clicks" that corresponds to links that were selected as a sponsored link, which is a subset of the "search clicks" feed.

The ads feed corresponds to a list of advertisements presented to and viewed by a user, while the ads FAS feed corresponds to an aggregation of advertisements viewed or presented to the specified user. The ads FAS feed is also associated with a "page view" feed that corresponds to ads that are presented to a user on a web page, an "ad view" feed that corresponds to advertisements that are viewed by a user and a "domain information" feed that corresponds to domain sources of the user. Another selectable type of advertisement feed (not shown) may include data captured when a user selects or clicks an advertisement.

Another feed called "bt_travel_dest" may monitor similar behaviors mentioned above that are particularly performed on Yahoo's Travel property (i.e., http://travel.yahoo.com). Examples include searching for particular travel destination flights.

The feeds may also include a set of "Rules Engine" feeds, "Rules Engine Aggregate Feeds", and one or more feeds for a particular on-line business, such as a set of store X feeds. The set of "Rules Engine" feeds may correspond to metrics regarding a user's intensity and recency metrics as related to certain activities, such as advertisement or search results selection. For instance, intensity may correspond to the frequency with which a user has shown interest in an item or category. The recency metric may capture how recently a user has performed a certain activity or has shown interest in a particular category. Therefore, the intensity and recency together can capture a user's behavior in terms of different categories, for example. The Rules Engine feeds may also include a testing feed that corresponds to a set of specially retained test data that has been copied from another warehouse. Selection of the set of "Rules Engine" feeds may also cause automatic selection of all preceding feeds, such as "BT Search", ULT, Ads, and the various FAS feeds.

Upon the selection of certain feeds, more information might be requested from the user. For instance, if the ULT feed is selected, the user is given the option of specifying the source or destination page identifier. This feature allows the user to track, for example, all users who have landed to a certain page P from various Yahoo! pages.

As shown, the "Rules Engine Aggregate Feeds" include a "Travel Aggregation" feed for user travel activities, a "Domain Aggregation" feed for user domain origins, an "Advertisement Click Aggregation" feed for a user's selection or clicking of advertisements, a "Search Click Aggregation" feed for a user's selection or clicking of search results, an "Advertisement View Aggregation" feed for a user's viewing of advertisements, a "Search Query Aggregation" feed for a user's search queries, a "Page View Aggregation" feed for a user's page viewing, and a "Sponsor Clicking Aggregation" for a user's selection or clicking of sponsored search results.

The X Feeds include the feeds that are relevant for a particular on-line product or service entity (referred to as "X"). In the illustrated example, a "Search Query" feed for a user's search queries for products or services, a "Domain Information" feed for a user's domain origin, a "Domain Aggregation" feed for an aggregation of domain origins over a specified time period, a "Search Query Aggregation" feed for a user's search queries over a specified time period, a Recency metric, and an Intensity metric.

Figure 7:
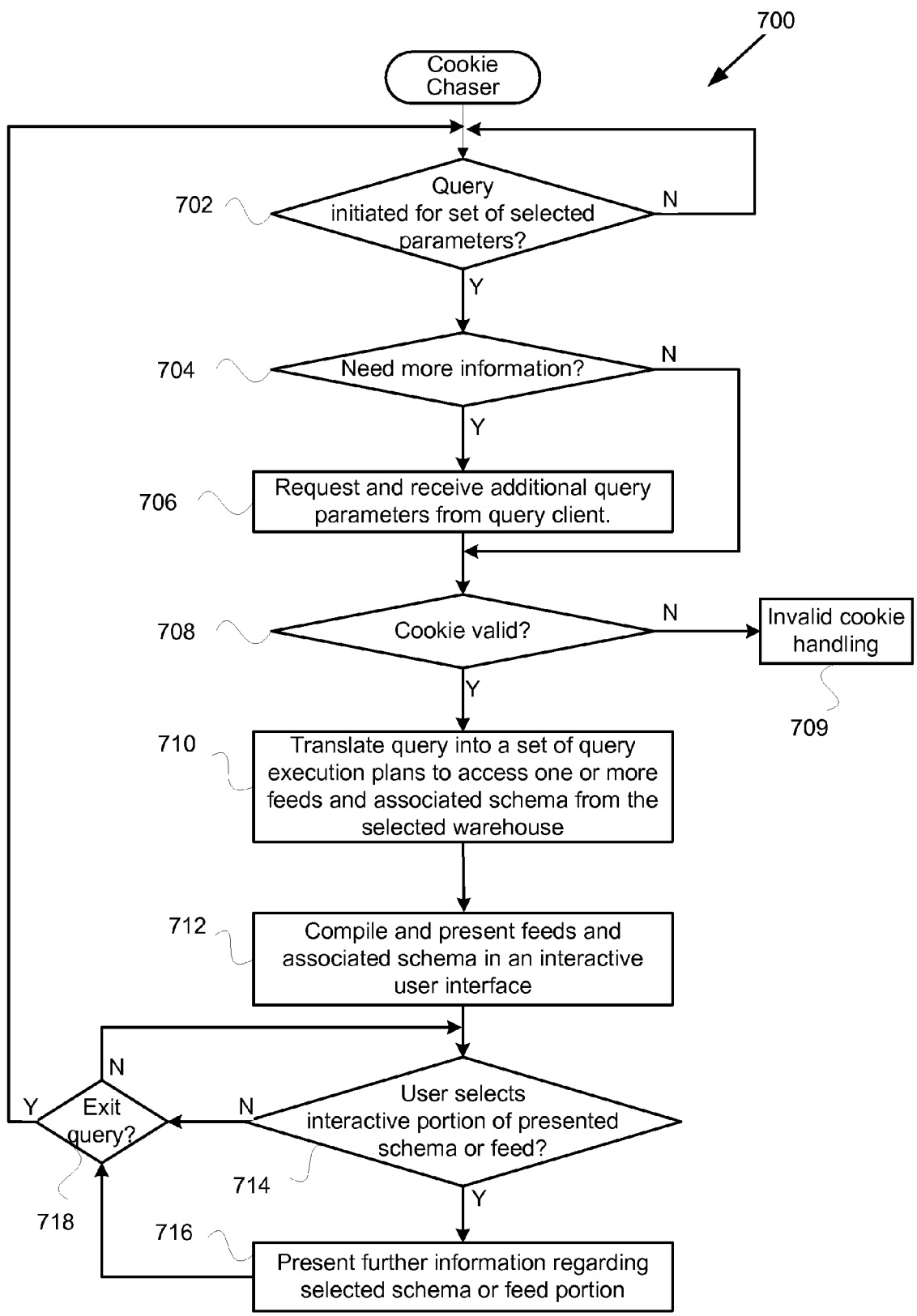
FIG. 7 is a flowchart illustrating a procedure for performing a cookie chaser query in accordance with one embodiment of the present invention.

Referring back to FIG. 5, operation of the cookie chaser will now be described. FIG. 7 is a flowchart illustrating a procedure for performing a cookie chaser query in accordance with one embodiment of the present invention, and this flowchart will be described in conjunction with the components of FIG. 5 as an example implementation. Initially, it may be determined whether a query for a set of selected parameters has been initiated in operation 702. The cookie chaser may continue to wait for a query initiation in operation 702. It may be determined that a query has been initiated in any suitable manner. For instance, a user at a query client, e.g., query client 103 of FIG. 1, selects various feeds from feed portion 601 of client interface 600, specifies a login or browser cookie, a time period, and a warehouse in parameter portion 608 of client interface 600, and clicks on the "Querying Feeds" input button 610 of client interface 600.

After it is determined that a query has been initiated, it may then be determined whether more information is needed in operation 704, for example, by query validation module 503. If more information is needed, additional query parameters may be requested and received from the query client in operation 706. For example, query validation module may request and receive additional information from client interface 502 or 600. If no more information is required, this operation may be skipped. If a user selects particular feeds in feed portion 601, other parameter input fields or interface mechanisms may be presented to the user in the client interface, for example, in parameter portion 608 so that the user may enter more information for the current query. For instance, when a FAS type data field is selected in feed portion 601, a time period field for such feed may be presented to the user in parameter portion 608 for entry of a specific time period by the user into such time period field. In another example, when this ULT feed is selected, a source and destination page may also have to be entered by the client. In other examples, a locale identifier may have to be entered.

When all information that is required for the query has been received by the cookie chaser process, it may then be determined whether the specified cookie (or user identity) is valid, for example, by cookie verification module 506, in operation 708. A cookie may be verified in any suitable manner. In one implementation, it is determined whether the received cookie value exists in the service provider's user database and is specified in such database as a valid cookie value. Anti-spoofing techniques may also be deployed to filter invalid user cookies. If a cookie is determined to not be valid, invalid cookie handling may commence in operation 709. An invalid cookie process may include any suitable error handling processes, such as presenting an error message to the client or requesting that the user re-enter the cookie value.

After the cookie has been verified, the query (and query parameters) may then be translated, for example, by query constructor 504 into a set of query execution plans 508 to access one or more feeds and their associated score schemas from one or more selected warehouses 510 in operation 710. For instance, the query and its associated parameters may be in the form of a URL (universal resource locator) request, and the query constructor module 504 translates this query request into a set of database requests that are sent to the selected warehouses or databases.

The obtained feeds and their associated schemas are then compiled and presented together, for example, by result set generator module 514 in an interactive user interface, e.g., query user interface 502, in operation 712. This compilation may include decompression and filtering of the retrieved data feed information into a readable format. The obtained feed(s) generally will include data traces of a user's behavior over a specified period of time for activities or feed types specified in the query.

It may be determined, for example, by schema fetcher module 512, whether the user has selected an interactive portion of the presented schema or feed(s) in operation 714. If the user has interacted with the presented information, further information regarding the selected schema or feed(s) may then be presented based on the specific type of user interaction in operation 716, for example, by schema fetcher 512. In one example, the user may be presented with the specified user cookie followed by a string of numbers separated by commas, wherein each pair of numbers represents a particular category and associated user score. When the query client selects a particular number, the associated category for such selected category or score value is presented to the user in the client interface. Alternatively, when the user selects a particular score, the user may be presented with the corresponding feed data that was used to generate such selected score. Furthermore, in an example in which the user is presented with the tuple <coockie_id, cat1, score1, cat2, score2, etc>, where "cat1" and "cat2" correspond to category code values and "score1" and "score2" correspond to score values for such categories, respectively, the user can use the schema to find out what each category code (cat1, cat2, etc.) represents. For example, the category code value 80 might be related to automotive, etc.

If the user does not choose to interact with the presented feed(s) or schema or has finished interacting, it may then be determined whether to exit the query in operation 718. By way of examples, the user may close the query results presentation window, select an exit button on the interface, time out, etc. If an exit query has occurred, then the cookie procedure may be repeated for a new query. Otherwise, the procedure may wait for further user interaction with the presented feed(s) or schema.

The obtained information for the selected feeds and score schema may take any suitable format that can easily be viewed by the client user. By way of example, if the client user selects a search query feed (e.g., "BT Search" or "bt_search_stream" of FIG. 6), a list of searches that have been performed by the user may be presented. For instances, the row entries of the user search database of FIG. 2 may be listed for the selected user (e.g., with the user_ID possibly omitted since the query client already knows and has entered the selected user's identity). A set of user scores that were determined based at least on the selected feed is also presented. In the search query example, the user score schema may take the form of a list of category and score values for the selected user: user_ID, category value 1, score value 1, category value 2, score value 1, etc. Each pair of category and score values may be in the form of numbers, for example, with the category numbers each corresponding to a specific category. The query user may select a category value (or associated score) to thereby cause the related category's name to be presented to the user in an interactive mode. The scores that are presented to the query client may be based on at least the search query feed for the selected user. In the aggregate or FAS feed examples, the presented search data may be similar but limited to a specified time period, as well as the presented scores being based on such specified time period.

When the ULT feed is selected, a list of web links (e.g., web pages or advertisements) for the selected user are presented to the query client, along with score schema data that is at least based on such presented list. This list of web links corresponds to the web pages which the selected user has traversed as the user moves from a source page to a destination page. The listed web pages may correspond to all the web pages which the selected user has traversed or a subset as defined in the query (e.g., search result links, advertisement links, or sponsor links). The source page and destination page may be specified by the query. A score schema, that is at least based on this web page list, may also be presented along with this web page list in the client interface.

When an advertisement feed is selected, a list of advertisement data may be presented to the client user similar to the above described search feed information. For instance, each entry in the advertisement list may include a date field for specifying the event data, an advertisement link field for specifying the advertisement link, and an action field for specifying the selected users action (e.g., viewing or selection or clicking) with respect to such advertisement link.

Embodiments of the present invention allow efficient tracing of user activities with respect to a particular provider network, for example. Furthermore, it is possible to simultaneously trace several behavior targeting processes and compare their outputs in a single client interface and to interact with query outputs (e.g., further querying their associated metadata, compare several pieces of results against one another, modify the original query, etc). These cookie chaser mechanisms may allow a significant productivity increase in tracking users' behavior.

Additionally, embodiments of the present invention enable processes to assure the accuracy, validity and integrity of user activities and behaviors with respect to a provider network, for example. For example, embodiments of the present invention allow a convenient and fast way of verifying user score data when input test data is being used. For example data accuracy can be verified by comparing the query output with the expected values of user scores when input test data is being used. Similarly, data validity can be checked by comparing a feed with its score schema to see if the query results conform to their schema. Finally, data integrity can be checked by tracing the output among several behavior targeting modules and verifying that the high-level constraints have been met by behavior targeting modules (e.g., users activities on an individual day should be included in the module in charge of storing users' aggregated activities).

Figure 8:
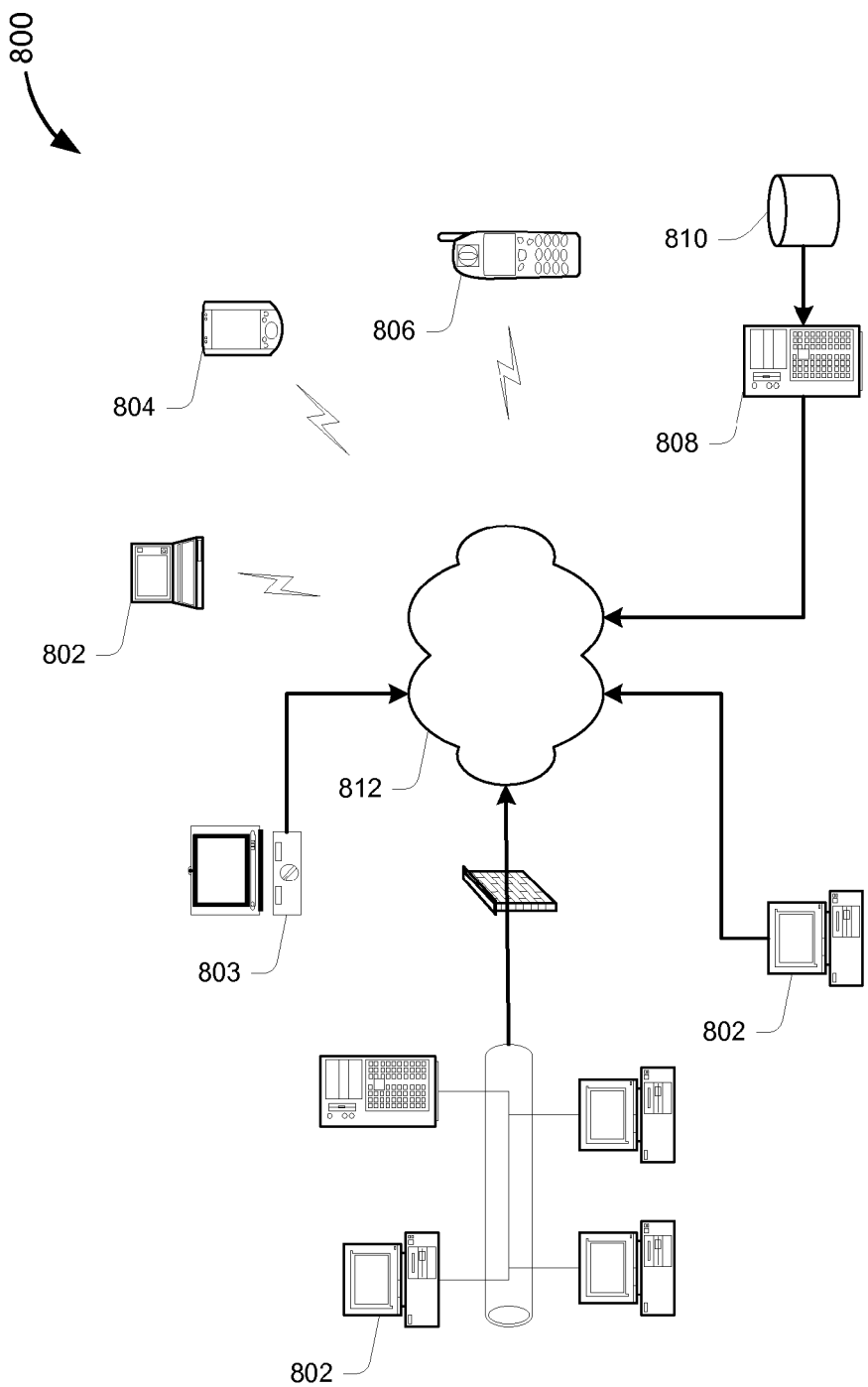
FIG. 8 is a simplified diagram of a network environment in which specific embodiments of the present invention may be implemented.

Embodiments of the present invention may be employed to perform cookie chaser processes in any of a wide variety of computing contexts. For example, as illustrated in FIG. 8, implementations are contemplated in which the relevant population of users interact with a diverse network environment via any type of computer (e.g., desktop, laptop, tablet, etc.) 802, media computing platforms 803 (e.g., cable and satellite set top boxes and digital video recorders), handheld computing devices (e.g., PDAs) 804, cell phones 806, or any other type of computing or communication platform.

And according to various embodiments, user on-line behavior information may be obtained using a wide variety of techniques. For example, user knowledge/interest/education scores and information representing a user's interaction with a local application, web site or web-based application or service may be accomplished using any of a variety of well known mechanisms for recording and determining a user's behavior. However, it should be understood that such methods are merely exemplary and that information may be collected in many other ways.

Once user behavior information, categories, and scores have been collected, this information may be accessed and analyzed according to the invention in some centralized manner. This is represented in FIG. 8 by server 808 and data store 810 that, as will be understood, may correspond to multiple distributed devices and data stores. The invention may also be practiced in a wide variety of network environments (represented by network 812) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 9:
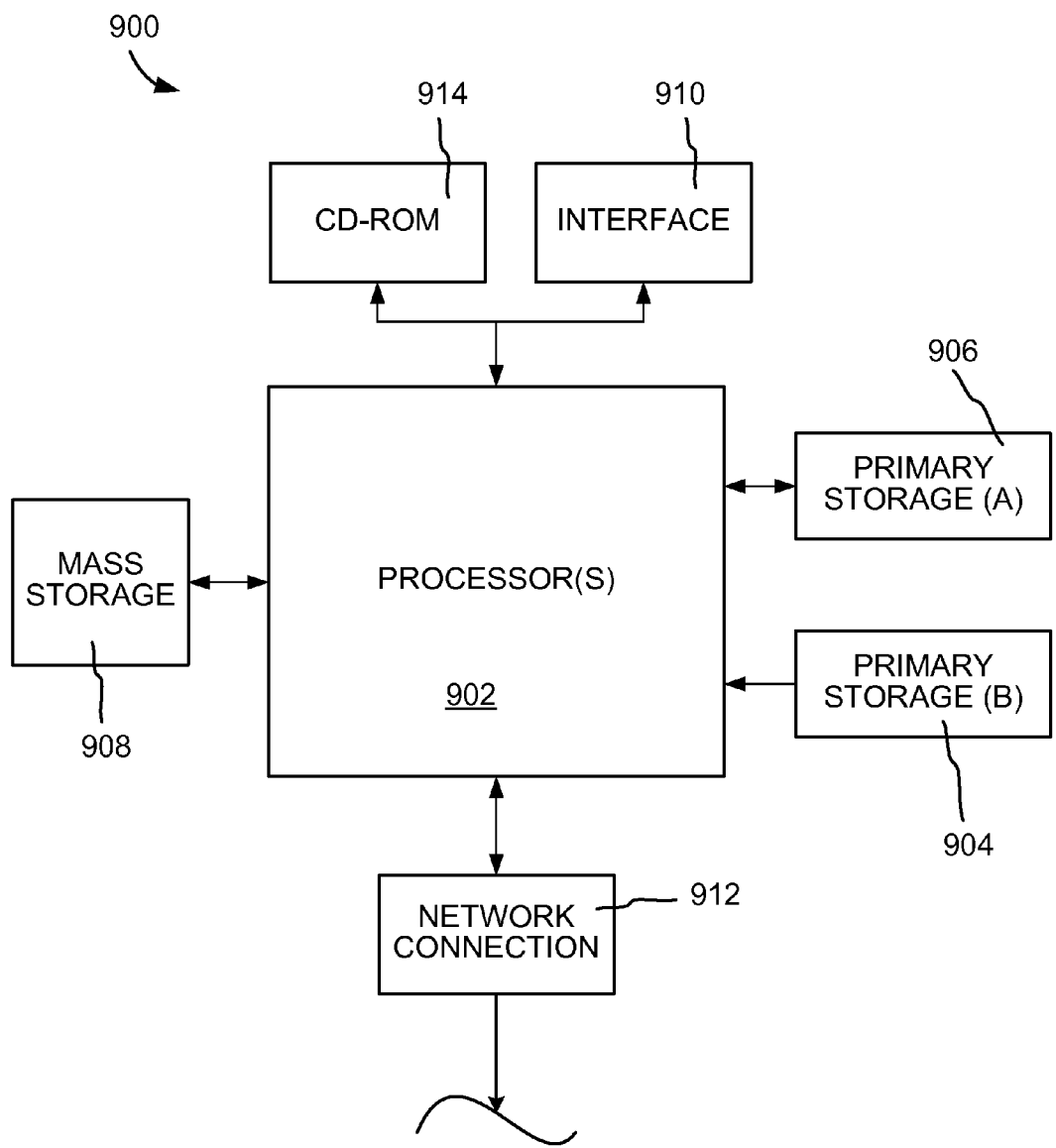
FIG. 9 illustrates an example computer system in which specific embodiments of the present invention may be implemented.

FIG. 9 illustrates a typical computer system that, when appropriately configured or designed, can serve as a cookie chaser engine. The computer system 900 includes any number of processors 902 (also referred to as central processing units, or CPUs) that are coupled to storage devices including primary storage 906 (typically a random access memory, or RAM), primary storage 904 (typically a read only memory, or ROM). CPU 902 may be of various types including microcontrollers and microprocessors such as programmable devices (e.g., CPLDs and FPGAs) and unprogrammable devices such as gate array ASICs or general-purpose microprocessors. As is well known in the art, primary storage 904 acts to transfer data and instructions uni-directionally to the CPU and primary storage 906 is used typically to transfer data and instructions in a bi-directional manner. Both of these primary storage devices may include any suitable computer-readable media such as those described herein. A mass storage device 908 is also coupled bi-directionally to CPU 902 and provides additional data storage capacity and may include any of the computer-readable media described above. Mass storage device 908 may be used to store programs, data and the like and is typically a secondary storage medium such as a hard disk. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 is also coupled to an interface 910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to an external device such as a database or a computer or telecommunications network using an external connection as shown generally at 912. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store user behavior information, user category and education scores, query information, query results information, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   receiving, from a query client, a query for a selected user and one or more data feeds selected from a plurality of feeds via a user interface having selection options for such feeds and wherein the different feeds correspond to a plurality of different streams of data for a plurality of different types or aggregations of on-line activities that have been performed by a plurality of users at multiple times and the different data streams of such feeds have been retained in a plurality of different feed databases;
   determining a plurality of scores in a plurality of categories for the selected user based on individual on-line activities of the selected user in the individual categories as aggregated from each data stream of the one or more selected feeds from the different feed databases; and
   to the query client, sending, for presentation, each score in each category for the selected user and an aggregation of the individual on-line activities in each individual category for the selected user,
   wherein the selected one or more feeds include a feed for a stream of advertisement data, and wherein a list of advertisements that were viewed or selected by the selected user are sent to the query client so that each advertisement in the sent list includes a time and date value, an advertisement identifier, and a selection field indicating whether the user has selected the advertisement.

2. A method as recited in claim 1, wherein the different types of on-line activities include performing search queries, selecting (or clicking) search results, selecting (or clicking) sponsor type search results, viewing advertisements, selecting (or clicking) advertisements, and selecting (or clicking) web pages.

3. A method as recited in claim 2, wherein at least one of the different feeds aggregates one or more data streams for the different types of on-line activities over a specified period of time.

4. A method as recited in claim 3, wherein the query includes a selected time period and the selected one or more data feeds are obtained for the selected time period, and wherein the scores are based on at least a portion of the one or more selected data feeds over the selected time period.

5. A method as recited in claim 1, wherein the selected one or more feeds include a feed for a stream of search queries, and wherein a list of search queries that were performed by the selected user are sent so that each search in the sent list includes a time and date value, a search term value, a search result, a selection field indicating whether the user has selected the search result, and a ranking value for the search result.

6. A method as recited in claim 1, wherein the selected one or more feeds include a feed for a stream of web page selections performed by the selected user as the selected user moves from a source page to a destination page, wherein the source and destination are specified by the received query.

7. An apparatus comprising at least a processor and a memory, wherein the processor and/or memory are configured to perform the following operations:

receiving, from a query client, a query for a selected user and one or more data feeds selected from a plurality of feeds via a user interface having selection options for such feeds and wherein the different feeds correspond to a plurality of different streams of data for a plurality of different types or aggregations of on-line activities that have been performed by a plurality of users at multiple times and the different data streams of such feeds have been retained in a plurality of different feed databases;

determining a plurality of scores in a plurality of categories for the selected user based on individual on-line activities of the selected user in the individual categories as aggregated from each data stream of the one or more selected feeds from the different feed databases; and to the query client, sending, for presentation, each score in each category for the selected user and an aggregation of the individual on-line activities in each individual category for the selected user, wherein the selected one or more feeds include a feed for a stream of advertisement data, and wherein a list of advertisements that were viewed or selected by the selected user are sent to the query client so that each advertisement in the sent list includes a time and date value, an advertisement identifier, and a selection field indicating whether the user has selected the advertisement.

8. An apparatus as recited in claim 7, wherein the different types of on-line activities include performing search queries, selecting (or clicking) search results, selecting (or clicking) sponsor type search results, viewing advertisements, selecting (or clicking) advertisements, and selecting (or clicking) web pages.

9. An apparatus as recited in claim 8, wherein at least one of the different feeds aggregates one or more data streams for the different types of on-line activities over a specified period of time.

10. An apparatus as recited in claim 9, wherein the query includes a selected time period and the selected one or more data feeds are obtained for the selected time period, and wherein the scores are based on at least a portion of the one or more selected data feeds over the selected time period.

11. An apparatus as recited in claim 7, wherein the selected one or more feeds include a feed for a stream of search queries, and wherein a list of search queries that were performed by the selected user are sent so that each search in the sent list includes a time and date value, a search term value, a search result, a selection field indicating whether the user has selected the search result, and a ranking value for the search result.

12. An apparatus as recited in claim 7, wherein the selected one or more feeds include a feed for a stream of web page selections performed by the selected user as the selected user moves from a source page to a destination page, wherein the source and destination are specified by the received query.

13. At least one computer readable storage medium having computer program instructions stored thereon that are arranged to perform the following operations:

receiving, from a query client, a query for a selected user and one or more data feeds selected from a plurality of feeds via a user interface having selection options for such feeds and wherein the different feeds correspond to a plurality of different streams of data for a plurality of different types or aggregations of on-line activities that have been performed by a plurality of users at multiple times and the different data streams of such feeds have been retained in a plurality of different feed databases;

determining a plurality of scores in a plurality of categories for the selected user based on individual on-line activities of the selected user in the individual categories as aggregated from each data stream of the one or more selected feeds from the different feed databases; and to the query client, sending, for presentation, each score in each category for the selected user and an aggregation of the individual on-line activities in each individual category for the selected user wherein the selected one or more feeds include a feed for a stream of advertisement data, and wherein a list of advertisements that were viewed or selected by the selected user are sent to the query client so that each advertisement in the sent list includes a time and date value, an advertisement identifier, and a selection field indicating whether the user has selected the advertisement.

14. An at least one computer readable storage medium as recited in claim 13, wherein the different types of on-line activities include performing search queries, selecting (or clicking) search results, selecting (or clicking) sponsor type search results, viewing advertisements, selecting (or clicking) advertisements, and selecting (or clicking) web pages.

15. An at least one computer readable storage medium as recited in claim 14, wherein at least one of the different feeds aggregates one or more data streams for the different types of on-line activities over a specified period of time.

16. An at least one computer readable storage medium as recited in claim 15, wherein the query includes a selected time period and the selected one or more data feeds are obtained for the selected time period, and wherein the scores are based on at least a portion of the one or more selected data feeds over the selected time period.

17. An at least one computer readable storage medium as recited in claim 13, wherein the selected one or more feeds include a feed for a stream of search queries, and wherein a list of search queries that were performed by the selected user are sent so that each search in the sent list includes a time and date value, a search term value, a search result, a selection field indicating whether the user has selected the search result, and a ranking value for the search result.

18. An at least one computer readable storage medium as recited in claim 13, wherein the selected one or more feeds include a feed for a stream of web page selections performed by the selected user as the selected user moves from a source page to a destination page, wherein the source and destination are specified by the received query.

19. A method as recited in claim 1, wherein the scores are in a plurality of advertisement categories for the selected user.

20. An apparatus as recited in claim 7, wherein the scores are in a plurality of advertisement categories for the selected user.

21. An at least one computer readable storage medium as recited in claim 13, wherein the scores are in a plurality of advertisement categories for the selected user.

* * * * *